US007305545B2

(12) United States Patent
Filipi-Martin et al.

(10) Patent No.: US 7,305,545 B2
(45) Date of Patent: Dec. 4, 2007

(54) AUTOMATED ELECTRONIC MESSAGING ENCRYPTION SYSTEM

(75) Inventors: Adrian Filipi-Martin, Charlottesville, VA (US); Brian A. Hope, Charlottesville, VA (US)

(73) Assignee: GlobalCerts, LC, Richmond, VA (US)

( * ) Notice: Subject to any disclaimer, the term of this patent is extended or adjusted under 35 U.S.C. 154(b) by 897 days.

(21) Appl. No.: 10/076,199

(22) Filed: Feb. 14, 2002

(65) Prior Publication Data

US 2003/0154371 A1 Aug. 14, 2003

Related U.S. Application Data

(60) Provisional application No. 60/268,506, filed on Feb. 14, 2001.

(51) Int. Cl.
*H04L 9/00* (2006.01)
*G06F 15/16* (2006.01)
*H04K 1/00* (2006.01)
*H04L 12/54* (2006.01)
*H04L 12/58* (2006.01)
*H04L 9/32* (2006.01)
*G06F 13/00* (2006.01)

(52) U.S. Cl. ............. 713/153; 713/155; 713/181; 709/203; 709/209; 380/30; 380/255

(58) Field of Classification Search ............. 713/153, 713/155, 156, 157, 158, 159, 171, 175, 181; 709/203, 209, 225, 229; 380/30, 255
See application file for complete search history.

(56) References Cited

U.S. PATENT DOCUMENTS

| 6,487,599 | B1 | 11/2002 | Smith et al. |
| 6,990,578 | B1* | 1/2006 | O'Brien et al. ............. 713/156 |
| 2002/0059144 | A1* | 5/2002 | Meffert et al. ............. 380/30 |
| 2003/0037261 | A1* | 2/2003 | Meffert et al. ............. 713/156 |
| 2003/0126085 | A1* | 7/2003 | Srinivasan ............. 705/51 |

FOREIGN PATENT DOCUMENTS

JP 11150554 A * 6/1999

OTHER PUBLICATIONS

Keok Auyong and Chye-Lin Chee, "Authentication Services for Computer Networks and Electronic Messaging Systems", ACM SIGOPS Operating Systems Review, vol. 31, Issue 3, Jul. 1997, pp. 3-15.*

* cited by examiner

*Primary Examiner*—Matthew Smithers
*Assistant Examiner*—Courtney D. Fields
(74) *Attorney, Agent, or Firm*—Douglas W. Kim; McNair Law Firm, P.A.

(57) ABSTRACT

A system and method of automating the management of public and private key pairs of a sender and recipient of electronic messages over a network and for retrieving public keys of senders or recipients from secured servers, local key rings, PKI server, or Certificate Authority without requiring client-side software or user maintenance.

4 Claims, 8 Drawing Sheets

AUTOMATED ELECTRONIC MESSAGING ENCRYPTION SYSTEM

CLAIM OF PRIORITY

This application claims priority to U. S. Provisional Patent Application, Ser. No. 60/268,506 entitled ELECTRONIC MESSAGING ENCRYPTION SYSTEM, filed Feb. 14, 2001, herein incorporated by reference.

FIELD OF THE INVENTION

This invention is directed to an automated electronic encryption system and, more specifically, to a system and method for managing key pairs and encrypting electronic transmissions over a network between senders and recipients of secure domains and senders and recipients of non-secure domains.

BACKGROUND OF THE INVENTION

As the pace of electronic commerce and as online communications increase, the need for security and the ability to authenticate communications between parties has become critical. To meet this need, a public key infrastructure (PKI) has been developed to allow for encryption, decryption, digital signatures, and signature authentication. This encryption scheme involves public and private keys, used in conjunction, to encrypt and decrypt electronic messages. Such companies as IdCertity, Verisign, and Thawte are known as Certificate Authorities, who verify the identity of entities seeking digital certificates, issue digital certificates and make digital certificates available in public databases. The University of Southern California as well as another at Massachusetts Institute of Technology (MIT) provides such databases. Encryption schemes that rely upon these public databases are unmanageably complex to the average user. The user must know the public key of each recipient, know how to encrypt a message, maintain their own private key, and know how to decrypt messages. These solutions rely on distributed client software for performing encryption functions thereby creating another disadvantage. Each client must be able to manage the keys of senders and recipient. Distribution of public keys requires heavy investments in software and labor by the end user in order to correctly implement the client software. These solutions require that the client perform the function of encryption and decryption. Such placement of responsibility on the individual users significantly opens the door to user error as well as undermines the security of the entire system. Further, the centralizing management of public and private keys creates a bottleneck inhibiting the speed in which an encryption network can be maintained, as well as limiting its ability for expansion.

Therefore, there is a need for an encryption system with automated distributed key management that is implemented and operated with minimal interaction between sender-s and recipients. There is also a need for a system capable of querying and discovering public keys from many different Certificate Authorities or other remote databases having public keys.

In describing the current invention, the following terms are helpful:

Domain—a logical unit representing a collection of computers or a segment of computer network accessible by specific users who are members of the domain.

Secure Domain—a logical unit representing a collection of computers or a segment of a computer network utilizing encryption software of one or more secure servers.

Message Verification—the process of using the public key to determine whether a message was sent, in actuality, from the named sender.

Certification—the process of associating a public key with an individual, organization, or other entity to determine that a message was "certified" from that specific entity.

Digital Certificate—the mathematical parameters of a public key combined with identifying information regarding the owner or user of that public key. The contents of a digital certificate are cryptographically signed in order to protect its integrity. A Certification Authority issues digital Certificates.

Certification Authority—A person, organization, or other entity charged with the duty of Certification. It is the Certification Authority's responsibility to perform whatever identity verification is necessary to associate a real person with the Digital Certificate that will represent them.

Internet Message Access Protocol (IMAP)—a computer network protocol that allows computer software to manage the contents of electronic mailboxes that is stored on a remote computer. By sending IMAP messages, software can fetch, store, and delete messages, as well as create, delete, and rename mailboxes.

Multi-purpose Internet Mail Extensions (MIME)—Special encoding protocols used by electronic communications software (both the world wide web and e-mail, for instance). These encodings allow messages to identify and transmit various kinds of content and formats such as binary, audio, video, graphics, or other content types.

Post Office Protocol (POP)—a computer network protocol that allows computer software to manage the contents of a single electronic mailbox that is stored on a remote computer. POP is very similar to, but simpler than, IMAP. By sending POP messages software can retrieve and delete messages from a single mailbox stored on a remote computer.

Private key—one of a pair of mathematical parameters that are uniquely and tightly linked to a "public key." Encryption algorithms use these parameters to produce an encrypted version of information. The private key is mathematically linked to its unique public key so that only that public key can decrypt information encrypted by that private key.

Public key—the other of a linked pair of mathematical parameters. Only the corresponding private key can possibly decrypt any information encrypted by the public key.

Public key infrastructure (PKI)—a combination of software, hardware, encryption technologies, and services that enable the protection of electronic communications and business transactions over a computer network.

Public key publication—the process of making public keys available to individuals who wish to send encrypted messages to others able to receive and decrypt encrypted messages.

Simple mail transfer protocol (SMTP)—a server-to-server protocol for delivering electronic mail. SMTP is the standard protocol used presently on the Internet as well as other TCPIP networks.

In order for an encryption system to function, there must be controlled access to the public and private keys of the senders and recipients. The sender of a message requires access to the recipient's public key for encrypting a message. The sender needs access to his own private key for signing a message. The sender needs access to his private key for decrypting messages received. The recipient requires access to the sender's public key for signature authentication. Therefore, both the sender and recipient must have a system, process or method for discovering the respective public keys as well as a system, process or method for securely storing and accessing their respective private keys. Advantageously, access to the public and private keys, the related process for encryption, decryption, signing, and authentication should be automated so that intervention by the sender or recipient is not required.

Accordingly, it is an object of this invention to provide for an automated encryption system for encrypting, decrypting, signing, and authenticating electronic messages, attachments and documents without significant maintenance or user intervention.

It is another object of this invention to allow a system administrator to maintain public and private key pairs for senders and recipients so that the burden of maintenance of the encryption system is focused on the administrator rather than the sender and recipient.

It is another object of this invention to provide for access to the public keys of users located outside of the specific secure domain.

SUMMARY OF THE INVENTION

The above objectives are accomplished by providing an automated encryption system for encrypting an electronic message from a sender to a recipient having a computer readable medium, and a network port in communication with the computer readable medium for accessing a set of public key data having a public key associated with the recipient. A set of computer readable encryption instructions is embodied in the computer readable medium for receiving the electronic message from the sender addressed to the recipient, retrieving the public key associated with the recipient from the public key data via the network connection, encrypting the electronic message according to the public key associated with the recipient, and, forwarding the encrypted message to the recipient for subsequent retrieval so that the electronic message is automatically encrypted and delivered to the recipient. The invention can also include a set of private key data embodied in the computer readable medium having a private key associated with the sender with the set of computer readable encryption instructions including instructions for retrieving the private key associated with the sender from the set of private key data, and, signing the electronic message from the sender according to the private key associated with the sender so that the recipient can verify the authenticity of the electronic message. The set of private key data contained within the computer readable medium can include a private key associated with the sender; and, a set of computer readable access instructions embodied in the computer readable medium for: receiving an access attempt input from the sender, retrieving the private key associated with the sender from the set of private data, validating the access attempt input according to the private key to determine whether a valid access attempt input has been provided, and, encrypting the electronic message according to the public key if the access attempt input is valid so that only senders with valid access attempt inputs may send encrypted messages. Additionally, the set of computer readable access instructions can include instructions for signing the electronic message using the private key associated with the sender so that the electronic message can be authenticated. A set of private key data contained within the computer readable medium can exists with a set of computer readable key maintenance instruction embodied within the computer readable medium for: creating a key pair having the at least one public key associated with the senders, and, a private key associated with the public key and the sender, storing the public key within the set of public key data so that the public key associated with the sender is available for retrieval, storing the private key within the private key data so that the sender can retrieve the private key for decrypting message sent to the sender, and, deleting the key pair to prevent the sender from decrypting encrypted messages so that an automated key management system is provided for automatically managing key pairs for senders. A set of public key data can be embodied within the computer readable medium. A set of encrypted private key data can be contained within the computer readable medium as well as a set of computer readable key maintenance instruction embodied within the computer readable medium for: creating a key pair having the at least one public key associated with the sender and a private key associated with the public key and the sender, storing the public key within the set of public key data so that the public key associated with the sender is available for retrieval, receiving a password from the sender, encrypting the private key according to the password, storing the encrypted private key within the private key data so that the sender can retrieve the private key for decrypting message sent to the sender, and, deleting the key pair to prevent the sender from decrypting encrypted messages so that an automated key management system is provided for automatically managing key pairs for senders.

The invention can also include a set of private key data embodied within the computer readable medium having a private key associated with the recipient; a set of computer readable decryption instructions embodied within the computer readable medium for: receiving the electronic message from the sender to the recipient, retrieving the private key associated with the recipient from the set of private key data, decrypting the electronic message according to the private key, and, providing the decrypted message to the recipient so that the recipient automatically retrieves and decrypts an electronic encrypted message without manually managing private keys. A network port can be included in communication with the computer readable medium for accessing a set of public key data having a public key associated with the sender; a set of computer readable message verification instructions embodied within the computer readable medium for: receiving the encrypted message having a digital signature associated with the sender, retrieving the public key associated from the sender from the digital signature, validating the electronic message according to the digital signature to provide validation information, and, providing the resulting validation information to the recipient so that the recipient can be notified as to the authenticity of the received encrypted message.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

The detailed description that follows may be presented in terms of program procedures executed on the computer or network of computers. These procedural descriptions and representations are used by those skilled in the art to most effectively convey the substance of their work to others skilled in the art. The procedures herein described are generally a self-consistent sequence of steps leading to a desired result. These steps require physical manipulations of physical quantities such as electrical or magnetic signals capable of being stored, transferred, combined, compared, or otherwise manipulated. An object or module is a section of computer readable code that is designated to perform a specific task or tasks. Actual computer or executable code or computer readable code may not be contained within one file or one storage medium but may span several computers or storage mediums. The terms "secure server", "PKI server", and "mail server" can be hardware, software, or a combination of hardware and software that provides the functionality described herein. These terms are not to be limited to one computer or one software application.

The present invention is described below with reference to flowchart illustrations of methods, apparatus (systems) and computer program products according to the invention. It will be understood that each block of the flowchart illustrations can be implemented by computer readable instructions. These computer instructions may be loaded onto a general purpose computer, special purpose computer or other programmable data processing apparatus to produce a machine, such that the instructions which execute on the computer or other programmable data processing apparatus create means for implementing the functions specified in the flowchart block or blocks.

These computer program instructions may also be stored in a computer readable memory that can direct a computer or other programmable data processing apparatus to function in a particular manner, such that the instructions stored in the computer readable memory produce an article of manufacture including instruction means for implementing the function specified in the flowchart block or blocks. The computer program instructions may also be loaded onto a computer or other programmable apparatus to produce a computer executed process such that the instructions, when executed on the computer, or other programmable apparatus, provide steps for implementing the functions specified in the flowchart elements.

Accordingly, elements of the flowchart support combinations of means for performing the specified functions, combinations of steps for performing the specified functions and program instruction means for performing the specified functions. It will also be understood that each block of the flowchart illustrations can be implemented by special purpose hardware-based computer systems, which perform the specified functions or steps, or combinations of special purpose hardware and computer instructions. The computer readable instructions for a secured server and mail server can be embodied in the computer readable medium of one computer, separate computers, or a network of computers.

The present invention now is described more fully hereinafter with reference to the accompanying drawings, in which preferred embodiments of the invention are shown. This invention may, however, be embodied in many different forms and should not be construed as limited to the embodiments set forth herein, rather, these embodiments are provided so that this disclosure will be thorough and complete, and will fully convey the scope of the invention to those skilled in the art.

Figure 1:
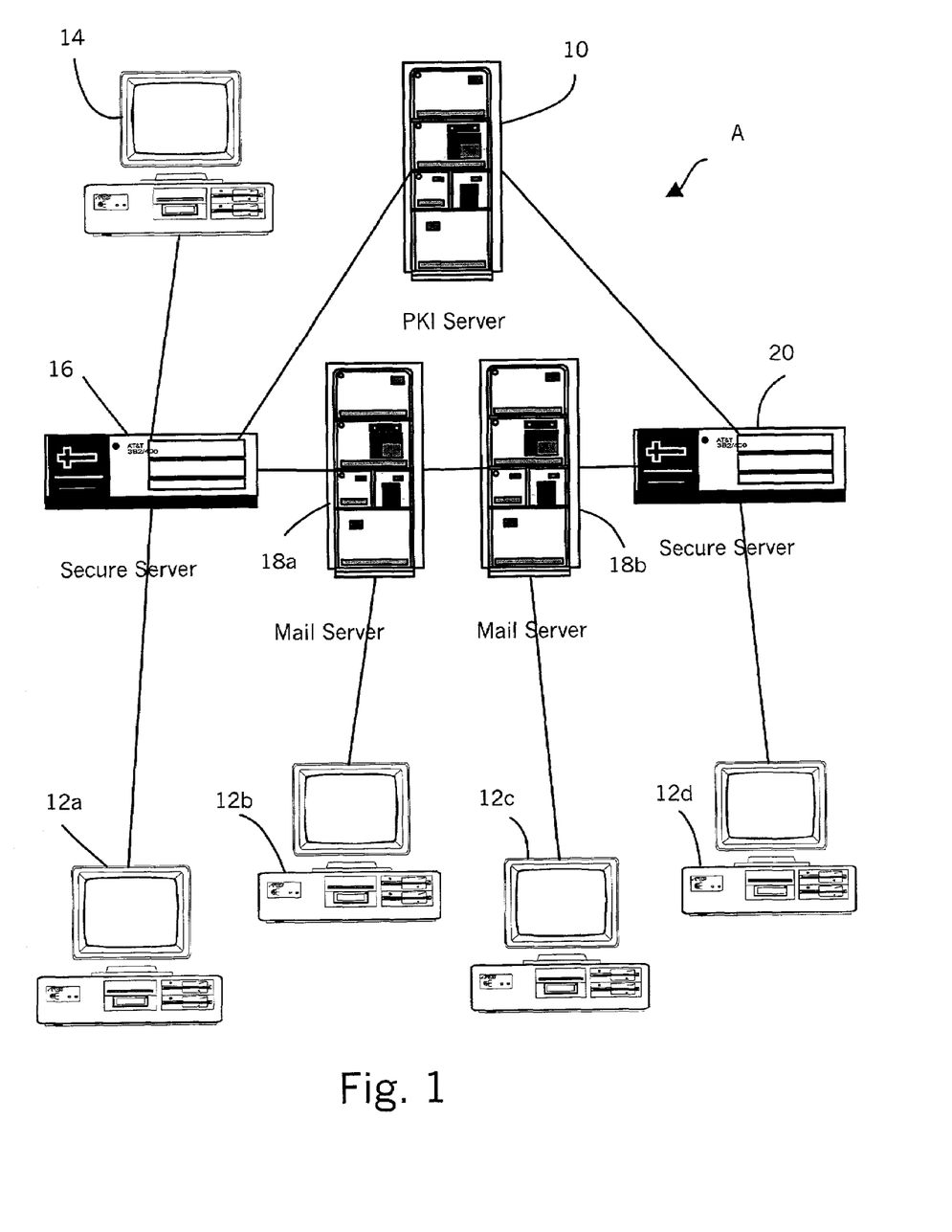
FIG. 1 is a diagram of the various hardware components of a secured domain and adjoining connection.

Referring now to FIG. 1, a PKI server 10 is shown in a network configuration, generally A, for maintaining public key for members of the PKI network. It should be noted that public keys can be maintained on secured servers 16 and 20 also. In practicing this invention, the sender using terminal 14 sends an electronic message, sends an encrypted document, or utilizes signature authentication or digital signature functions with one of the recipients of the network. In one embodiment, the public and private keys for the sender, as well as for recipient using terminal 12a, reside on secure server 16. Recipients using terminals 12b and 12c do not utilize the secure server and, therefore, may not have public keys or may not have public keys accessible by secured servers. Additionally, the recipients using terminals 12b and 12c may not have public keys if their respective certificate authorities are deemed untrustworthy or there is no access to the particular certificate authority's system. The sender and the recipient should be able to access the public keys of individuals outside their specific secure domains or networks so that the encryption functionality is not limited by physical connections to specific domains. Public keys should also be discoverable regardless of the particular Certificate Authority being used by a particular sender or recipient. The sender using terminal 14 and recipients using terminals 12a and 12b receive transmission services through mail server 18a while recipients using terminals 12c and 12d use mail server 18b. Recipient using terminal 12d utilizes secure server 20 where the public and private keys are stored. Mail servers 18a and 18b each run SMTP services for routing mail through network A as well as either POP or IMAP to provide mailbox services to the respective users. Additionally, sender using terminal 14 and recipient using computer 12a also use mail server 18a and secure server 16. Recipient 12b uses mail server 18a without secure services. Likewise, recipient 12c uses mail server 18b without secure services while recipient 12d uses mail server 18b and secure server 20. While illustrated as separate computers, the secured server and mail server can be software applications residing on a single computer and not limited to residing on separate computers.

Figure 2:
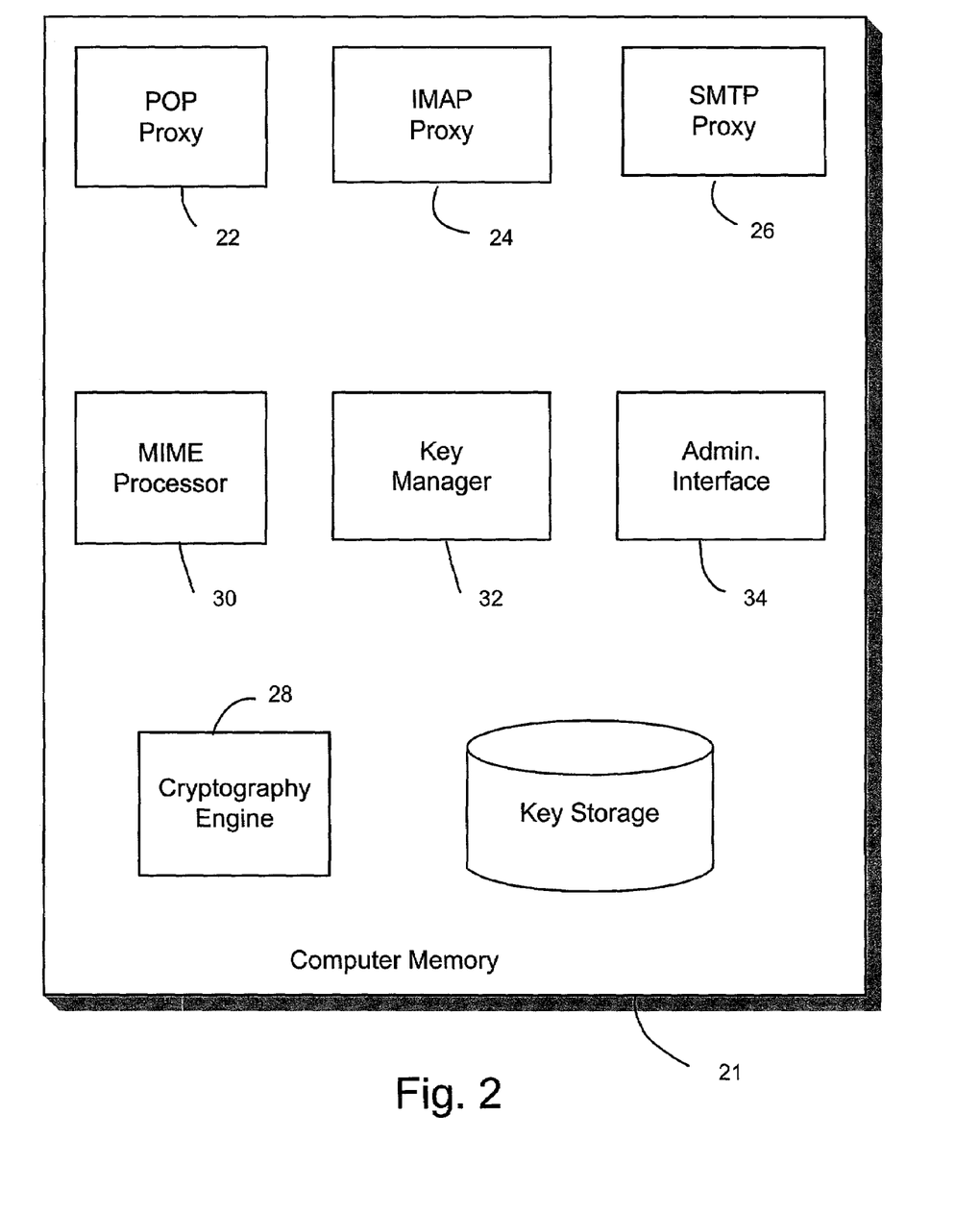
FIG. 2 is a diagram of the various modules or objects of a secured server.

Referring now to FIG. 2, the particular modules representing the functionality of computer readable instructions embodied on a computer readable medium of the secure server application 21 are shown. Secure servers 16 and 20 contain computer readable memory in communication with a processor as well as a network port for communications with other computers. POP proxy 22, is a set of computer readable instructions between the end user and a POP mail server for analyzing the content of mail received by the end user and invoking other modules such as a cryptography engine 28 and a MIME processor 30 as necessary to authenticate, decrypt, and format mail messages and associated attachments. IMAP proxy 24 is a set of computer readable instructions between the end user and the IMAP mail server for analyzing the content of mail received by the end user and, also, invoking other modules such as the cryptography engine and the MIME processor as necessary to authenticate, decrypt, and format mail and associated attachments. SMTP proxy 26 is a set of computer readable instructions between the end user and the SMTP server for analyzing the content of mail being sent by the end user and executing other modules such as the cryptography engine and the MIME processor as necessary to sign and encrypt mail messages and associated attachments. Cryptography engine 28 is a set of computer readable instructions for performing encryption, decryption, signing, and authentication of public. MIME processor 30 is a set of computer readable instructions that allows for the parsing and creation of mail attachments. Key manager 32 is a set of computer readable instructions for the storage and retrieval of public from the PKI server of the secured server and private keys from the secured server. Private keys are stored on the secure server and are encrypted with a user's pass phrase. Administrative interface 34 is a set of computer readable instructions that allow an authorized user with a web browser to create and manage user accounts and their associated key pairs, and to confirm that the secure server is in communication with the network.

Figure 3:
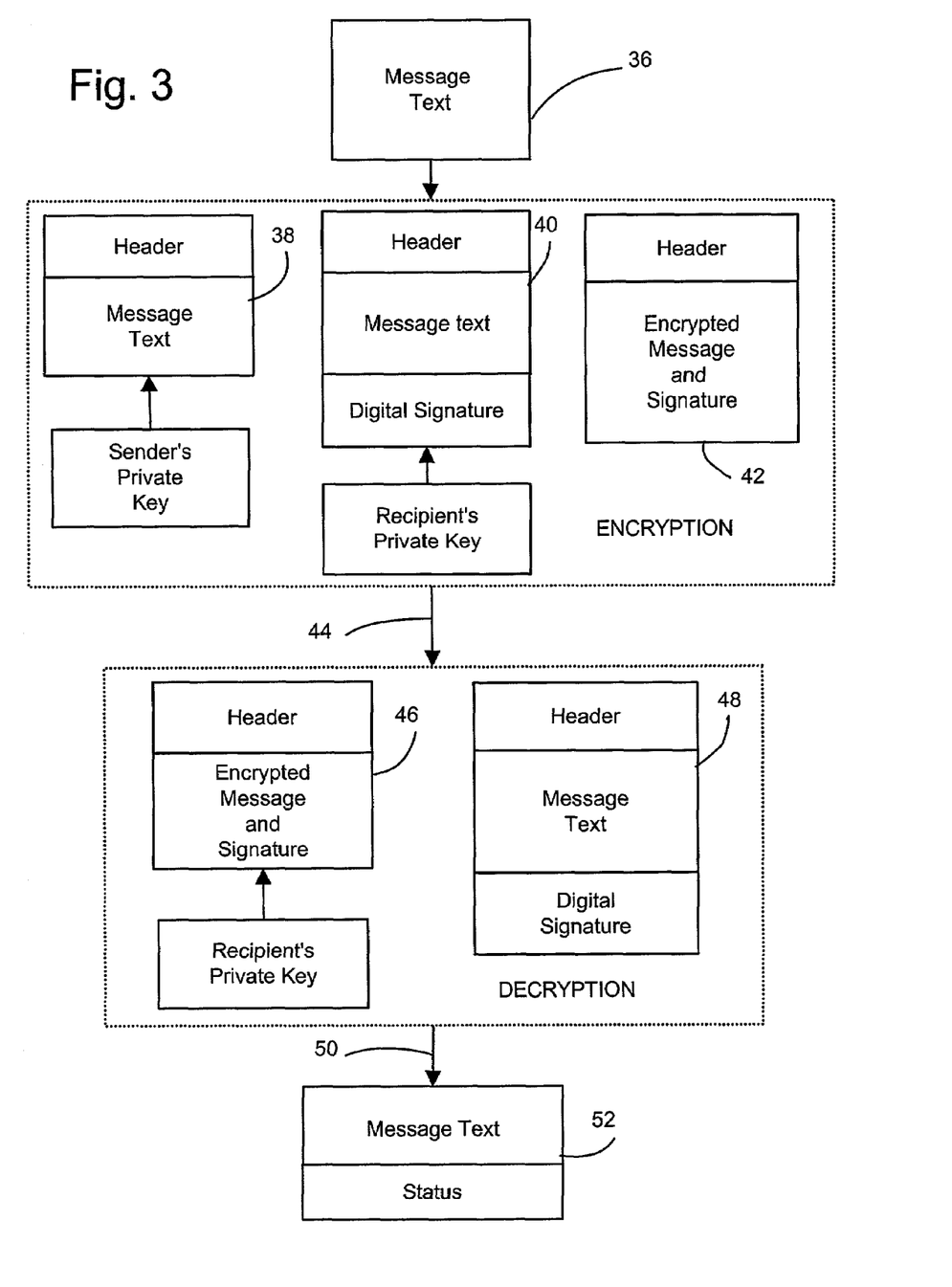
FIG. 3 is a schematic of the functionality of encryption.

Referring to FIG. 3, the functionality of the message flow is further illustrated as performed by computer readable instructions above described. When a sender drafts a message at step 36, the e-mail application will typically add header information to the message in step 38. The sender's private key can be located by computer readable instructions labeled the key manager 32 (FIG. 2) and can be used to sign the message. The key manager first searches the local key ring for the recipients public key. A key ring is a list of public keys explicitly found and verified by the sender. If the public key of the recipient is not found at the local key ring, the next step would be to look to the PKI of the sender's system. If the key is not found at the local PKI, the key manager can search outside the sender's PKI in other Certificate Authorities systems or other public database through network A. Once the public key associated with the recipient is discovered in step 40, the message is encrypted in step 42. The encrypted message is then sent to the recipient in step 44. Once received, the recipient's private key is retrieved and used to decrypt the encrypted message in step 46. A MIME attachment can be added to the encrypted message to report the results of the decryption and authentication at step 48. The message is then delivered to the recipient in step 50 to be viewed in step 52. The above steps are automated so that the objects, modules, and functionalities illustrated are performed without the sender or the recipient's interaction, thereby providing for a simple, easy to use, maintenance free encryption system. By merely signing out to a message system, the sender can send encrypted messages and the recipient can receive and decrypt encrypted messages.

Figure 4:
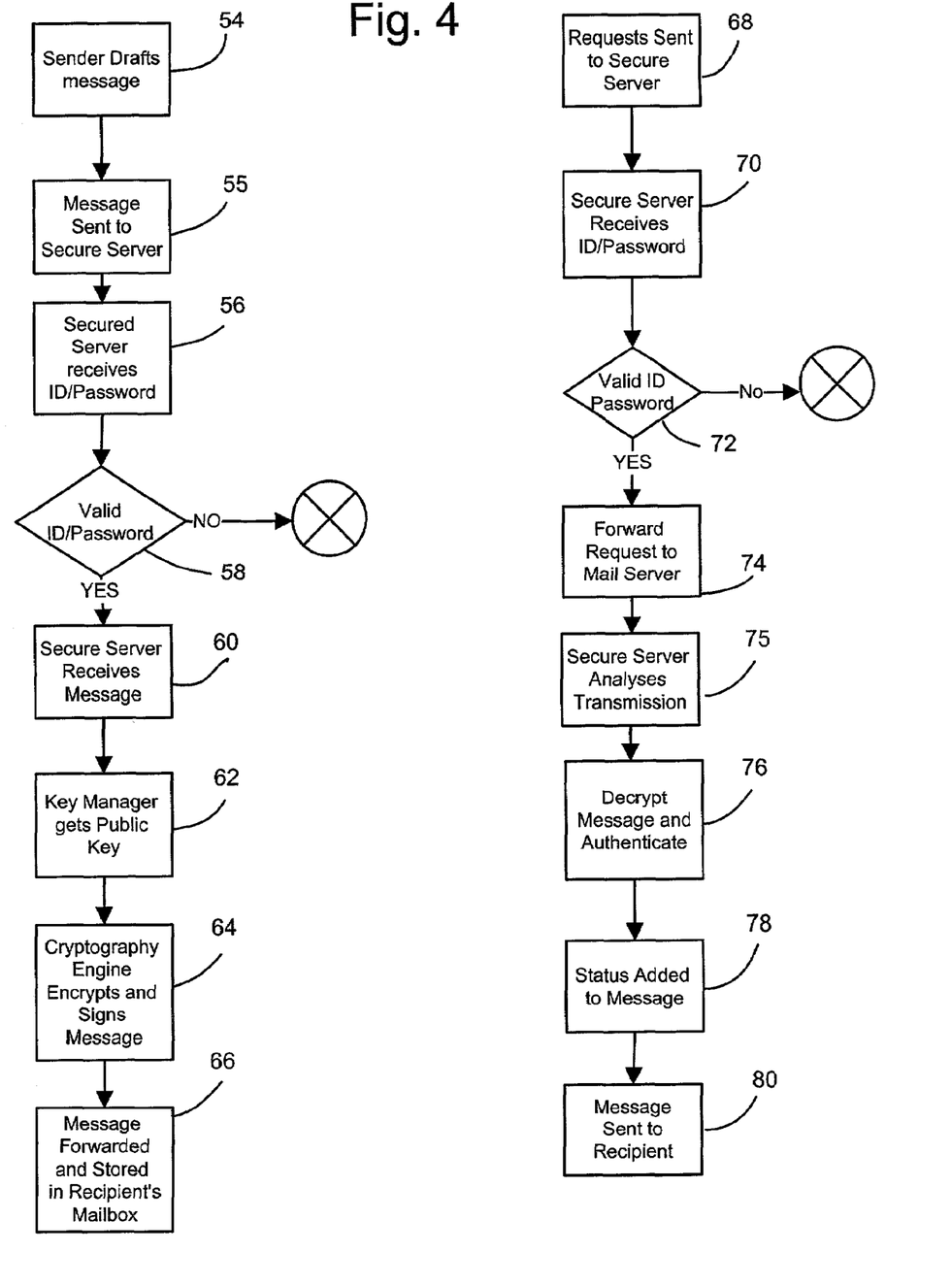
FIG. 4 are flowcharts between a sender and recipient of the same secure domain illustrating the steps for encrypting a message.

The hardware and software configurations of the system of this particular invention allow for at least four scenarios. The first of these scenarios is illustrated when a sender using terminal 14 drafts a message to be sent to recipient using terminal 12a. Referring to FIG. 4, the sender drafts a message in step 54. The message is sent through SMTP to secure server 16 in step 55. The secure server receives the ID and access attempt input supplied by the sender for the sender's account in step 56. The access attempt is used to attempt to decrypt the sender's private key. A successful decryption of the sender's private key validates access the attempt input. If either the ID or password are invalid at step 58 the secure server denies access and the transaction is ended. For example, the message would remain in the sender's outbox until the sender supplies the proper ID and password for the sender's account. Otherwise, the SMTP proxy on secure server 16 receives the message at step 60 and invokes the key manager to obtain the recipient's public key at step 62. The cryptography engine is then executed to encrypt the message according to the recipient's public key and. sign the message according to the sender's private key or digital signature at step 64. It should be noted that the encryption and signature processes are also performed on attachments that are included within electronic messages. The message is then forwarded to mail server 18a where the encrypted message is stored in recipient's mailbox at step 66.

When this recipient requests the mail message, a request is sent through IMAP or POP to secure server 16 at step 68. Secure server receives the recipient's ID and access attempt input at step 70. The access attempt input is used to attempt to decrypt the sender's private key. A successful decryption of the sender's private key validates the access attempt input. If the access attempt input is invalid at step 72, the request is rejected as described above. Otherwise, the POP or IMAP proxy residing on secure server 16 forwards the request to mail server 18a at step 74. Secure server 16 receives and analyzes the transmission at step 75. The encrypted message is then decrypted with recipient's private key and the sender's signature is authenticated using the sender's public key at step 76. Information concerning the success or failure of the decryption or authentication can be added to the message in a MIME attachment in step 78 and the message is delivered to the recipient in step 80.

Figure 5:
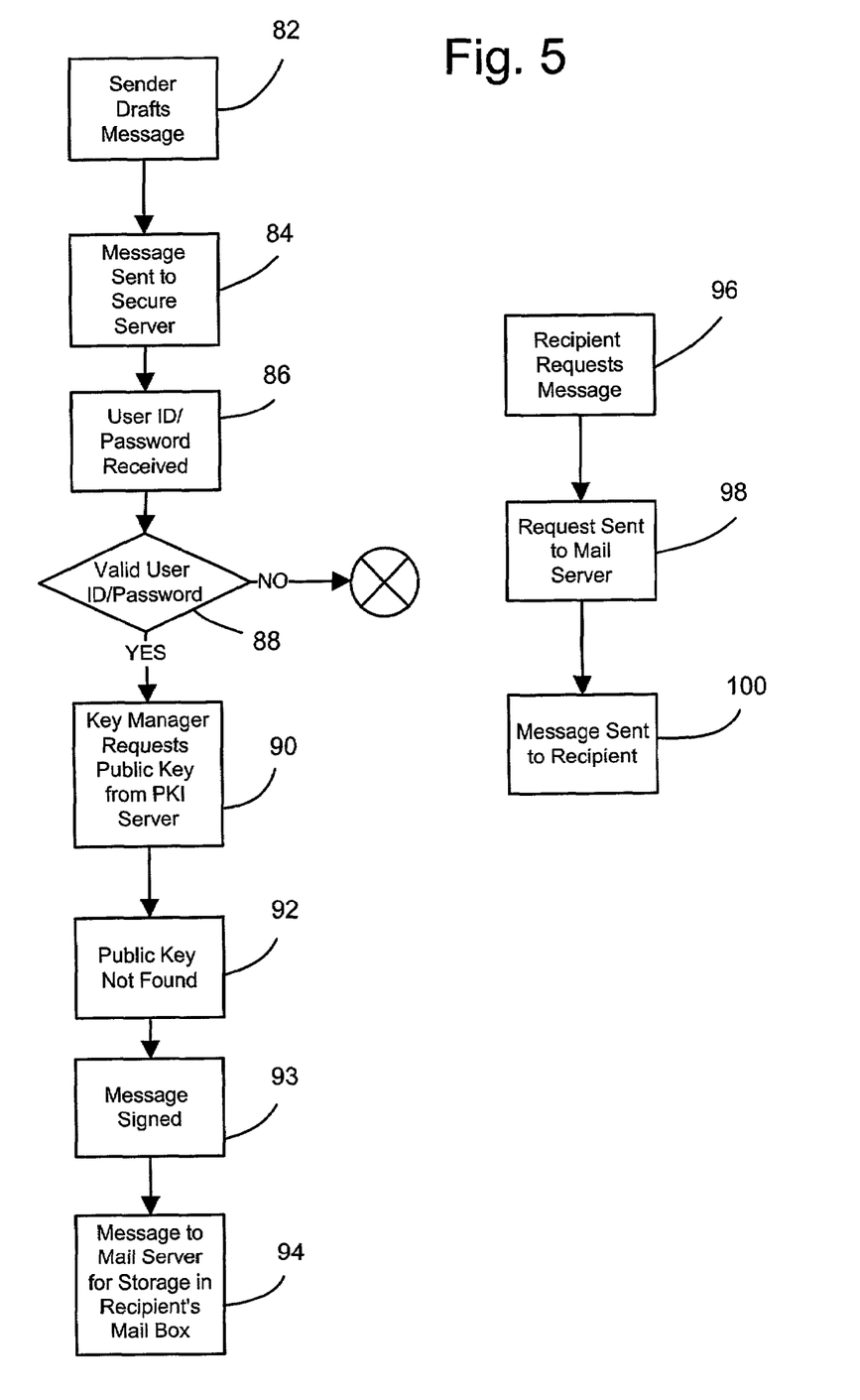
FIG. 5 is a flowchart illustrating the steps for signing a message between a sender of a secure domain and recipient on the same mail server, but outside the secure domain.

The second scenario presented includes the sender who is a member of a secure domain sending a message to a recipient who is not a member of a secure domain but, nevertheless, utilizes the same mail server. Referring now to FIG. 5, sender using client 14 (FIG. 1) drafts a message to be received by the recipient using terminal 12b at step 82. The message is sent by SMTP to secure server 16 at step 84. Secure server then receives the sender's ID and access attempt input at step 86. The access attempt input is used to attempt to decrypt the sender's private key. A successful of the sender's private key validates the access attempt. If either the ID or access attempt input is invalid at step 88, the sender's request is denied and the process ends. Otherwise, the SMTP proxy on secure server 16 receives the message and invokes the key manager to obtain the recipient's public key from the PKI server 10 at step 90. However, in this scenario, the recipient using terminal 12b does not have a public key at step 92 and the message can only optionally be signed, but not encrypted. The message can be signed in step 93. The message is then forwarded to mail server 18a where the message is stored in the recipient's mailbox at step 94. When the recipient requests the message at step 96, the request is sent through IMAP or POP to mail server 18a at step 98. The signed message is returned directly to the recipient using terminal 12b at step 100. The necessary public keys required to authenticate this message are included within the signature of the message so no searching for public keys is required and the public key of the sender can be derived from he digital signature.

Figure 6:
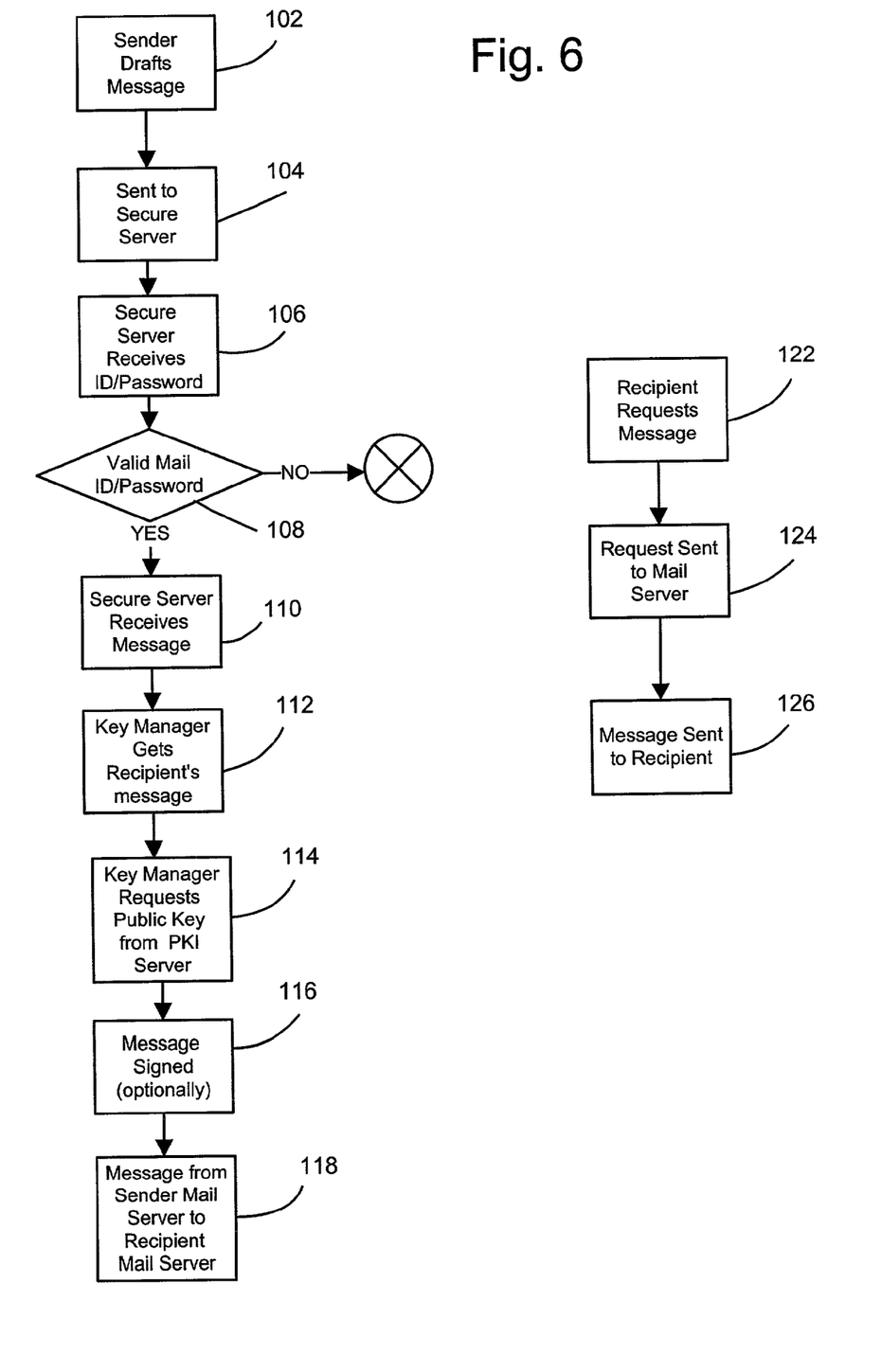
FIG. 6 is a flowchart for signing a message between a sender of a secure domain and recipient on a different mail server and outside the secure domain.

The third scenario is when a sender, who is a member of a secure domain, sends a message to a recipient of an insecure domain where the sender and recipient utilize different mail servers. Referring to FIG. 6, sender using terminal 14 (FIG. 1) drafts a message for receipt by recipient using terminal 12c at step 102. The message is sent by SMTP to secure server 16 at step 104. The secure server receives the sender's ID and access attempt input at step 106. The access attempt input is used to attempt to decrypt the sender's private key. A successful decryption of the sender's private key validates the access attempt input. If an invalid ID or password is received at step 108, the sender's request is denied and the process ends. Otherwise, the SMTP proxy on secure server 16 receives the message at step 110. The key manager is then executed at step 112 to attempt to find the recipient's public key at step 114. Since the recipient using terminal 12c may not have a public key or the public key cannot be found, or the Certificate Authority is not trusted, the message can only optionally be signed at step 116, but not encrypted. The message is then forwarded to mail server 18a and through normal SMTP, sent to mail server 18b at step 118. Here, the signed message is stored in the recipient's mailbox. When the recipient using terminal 12c wishes to retrieve the message, a request is sent via IMAP or POP to mail server 18b at step 122. The signed mail is returned directly to the recipient at step 124. Since the message was not encrypted, the only possible authentication would be signature authentication in step 126 if the recipient, coincidentally, has the proper decryption software. For example, Microsoft's Outlook® and Netscape's® Navigator have the necessary software while Eudora® and AOL® do not. This step only requires the use of the public key of the sender so that no searching for the public key is necessary.

Figure 7:
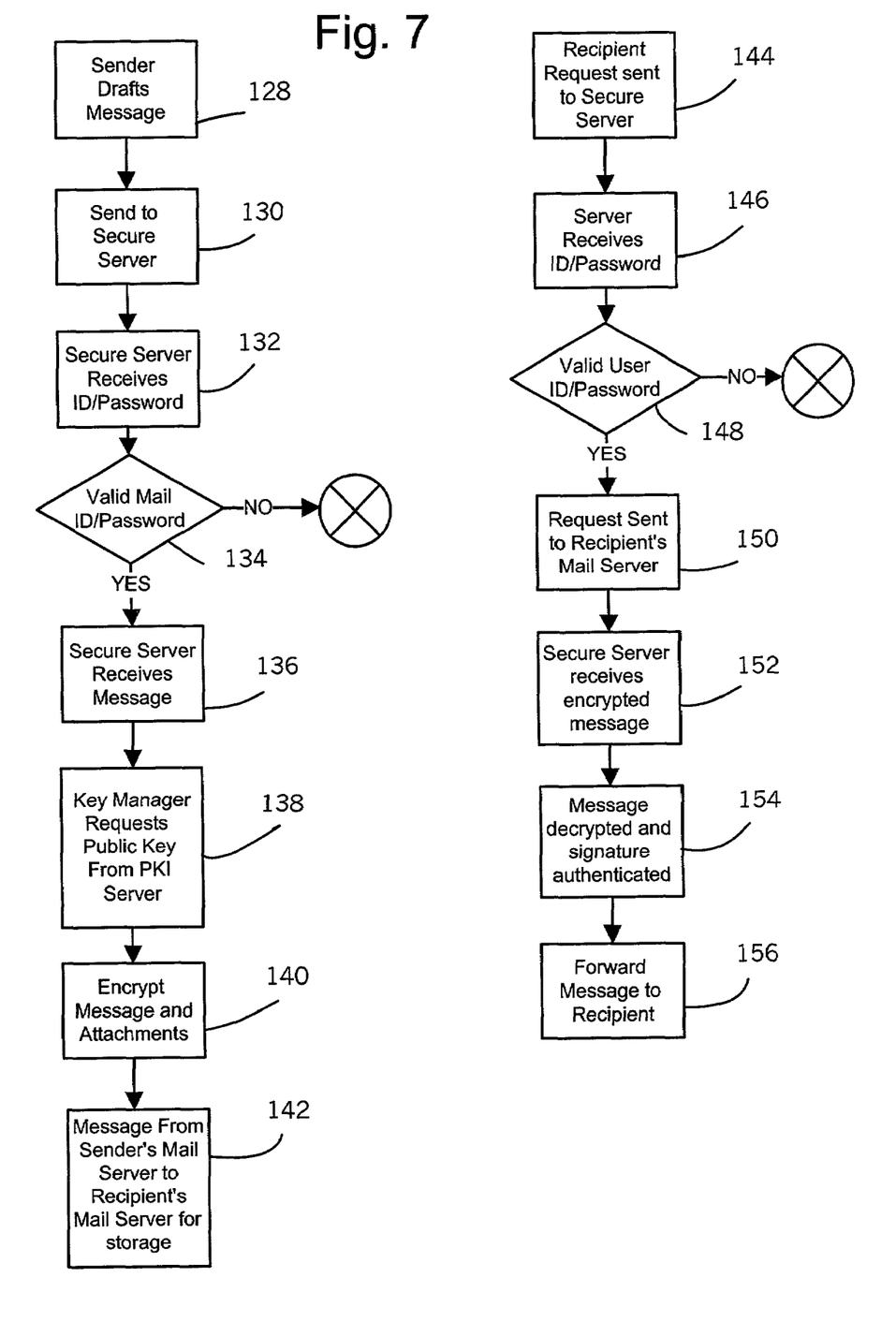
FIG. 7 is a flowchart for encrypting a message between a sender at one secure domain to a recipient of a different secure domain; and, FIG. 8 is a flowchart for encrypting a message between a sender outside a secure domain and a recipient within a secured domain.

The next scenario, described in FIG. 7, includes a message sent from a sender on a secured domain to a recipient who is a member of a different secured domain using a different secure server. Sender using terminal 14 drafts a message to be received by recipient using terminal 12d at step 128. The message is sent by SMTP to secure server 16. The secure server receives the sender's ID and access attempt input at step 132. The access attempt input is used to attempt to decrypt the sender's private key. A successful decryption of the sender's private key validates the access attempt. If the secure server does not receive a valid ID or password in step 134, the sender's request is denied. Otherwise, the SMTP proxy on secure server 16 receives the message at step 136 and executes the key manager to obtain the recipient's public key from the PKI server at step 138. The cryptography engine is then executed to encrypt and sign the message and any attachments at step 140. The message is then forwarded to mail server 18a through normal SMTP protocols stored in the recipient's mailbox at step 142.

When this recipient requests the mail message, the request is sent to secure server 20 at step 144. Secure server receives the recipient's ID and access attempt input for the recipient's mail account at step 146. The access attempt input is used to attempt to decrypt the sender's private key. A successful decryption of the sender' private key validates the access attempt input. If a valid ID and access attempt input is not provided at step 148, the request is denied. Otherwise, the POP or IMAP proxy on secure server 20 forwards the request to mail server 18b at step 150. Secure server 20 receives and analyzes the response at step 152 for the determination of the existence of encrypted content or not. The encrypted mail is then decrypted with the recipient's private key and the sender's signature is authenticated using the sender's public key at step 154. Information concerning the success or failure of the decryption and authentication can be added to the message and attached in the MIME format. The message is then delivered at step 156.

Figure 8:
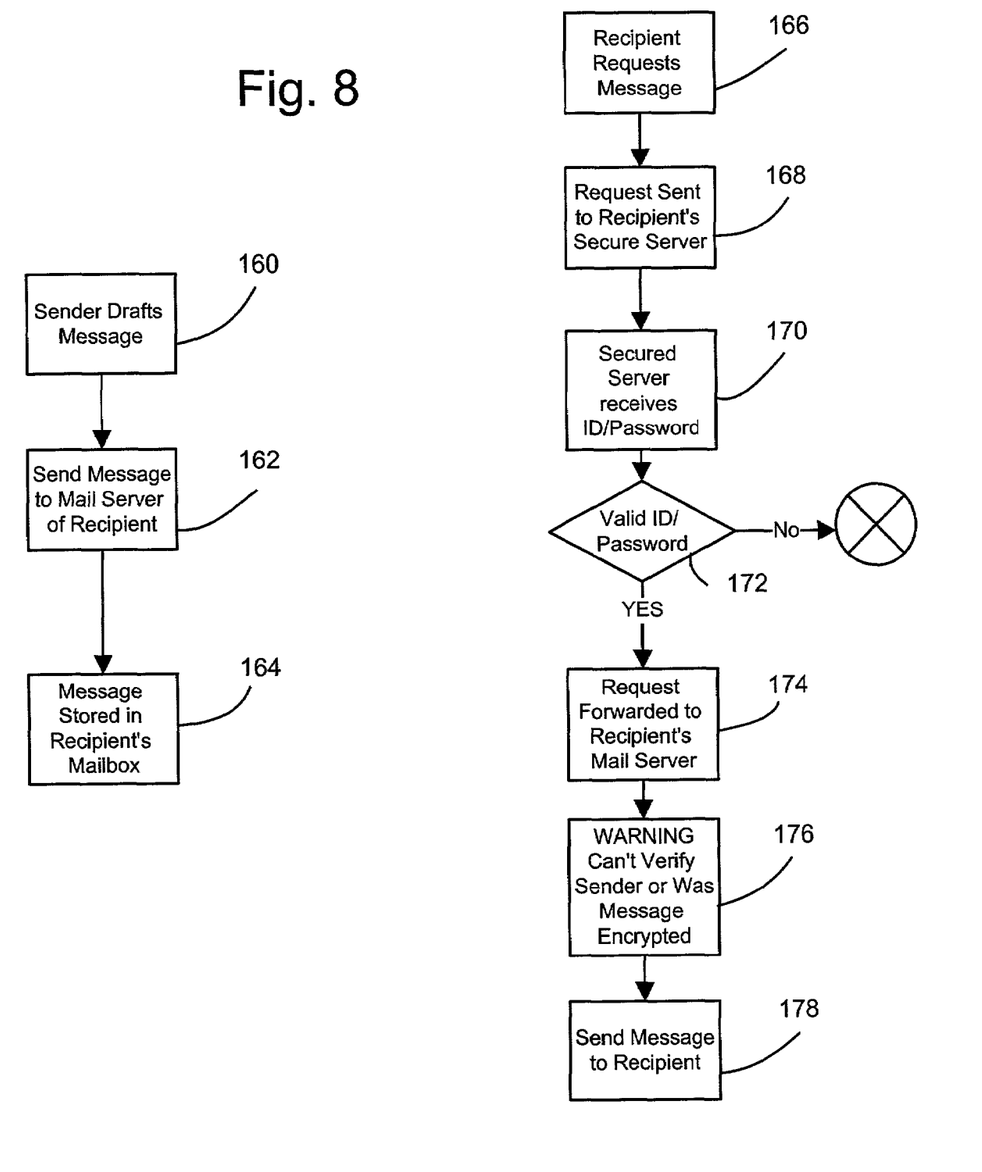

Another scenario includes when a sender is not a member of a secure domain but wishes to draft and send a message to a recipient who is a member of a secure domain. FIG. 8 illustrates this case. When a sender using terminal 12b drafts a message at step 160 for recipient using terminal 14, the message is sent through SMTP to mail server 18a at step 162 and stored in recipient's mailbox at step 164. When the recipient requests the message at step 166, the request is sent via IMAP or POP to secure server 16 at step 168. The secure server receives the recipient's ID and access attempt input at step 170. The access attempt input is used to decrypt the recipient's private key. A successful decryption of the access attempt input validates the access attempt input. If a valid ID or access attempt input is not received at step 172, the recipient's request is denied. If a valid password and ID is received, the POP or IMAP proxy on secure server 16 forwards a request to determine the presence of encrypted content. Therefore, MIME attachments that contain information warning that the identification of the sender and the integrity of the message cannot be verified can be added to the message at step 176. The message is then delivered at step 178.

While a preferred embodiment of the invention has been described using specific terms, such description is for illustrative purposes only, and it is to be understood that changes and variations may be made without departing from the spirit or scope of the following claims.

What is claimed is:

1. An automated encryption system for encrypting an electronic message from a sender to a recipient comprising:

a computer readable medium in communications with a sender's e-mail client;

a set of encrypted private keys associated with senders' ID's and passwords stored in said computer readable medium;

a set of computer readable encryption instructions embodied in the computer readable medium for receiving the electronic message from the e-mail client that is created by the sender and addressed to the recipient having the sender's ID and password, attempting to decrypt the sender's private key according to the sender's ID and password, if the sender's private key is successfully decrypted, attempting to retrieve the recipient's public key from the computer readable medium; if the sender's private key is successfully decrypted, and the recipient's public key is not located in the computer readable medium, attempting to retrieve the recipient's public key from a PKI server in communications with the computer readable medium, encrypting said electronic message according to the recipient's public key, forwarding the encrypted message to the recipient for subsequent retrieval so that the electronic message is automatically encrypted and delivered to the recipient without the need for the email client to retrieve the recipient's public key or encrypt the message.

2. The system of claim 1 wherein:

said set of computer readable encryption instructions include instructions for retrieving the private key associated with the sender from said set of private key data and digitally signing the electronic message from the sender according to the private key associated with the sender so that the recipient can verify the authenticity of the electronic message.

3. The system of claim 1 wherein:
said set of computer readable encryption instructions include instructions that if the sender's private key is successfully decrypted but the recipient's public key is not located on the PKI server, attempting to retrieve the recipient's public key from a certificate authority in communications with the computer readable medium.

4. They system of claim 1 including:
a set of computer readable key maintenance instructions embodied within the computer readable medium for creating a key pair having at least one public key associated with the sender and a private key associated with the public key and the sender, storing the public key within said set of public key data so that the public key associated with the sender is available for retrieval, receiving a password from the sender, encrypting the private key according to the password, storing the encrypted private key within said private key data so that the sender can retrieve the private key for decrypting messages sent to the sender, and, deleting said key pair to prevent the sender from decrypting encrypted messages so that an automated key management system is provided for automatically managing key pairs for senders.

* * * * *